ABSTRACT

United States Patent [19]

Hogan

[11] 4,160,912
[45] Jul. 10, 1979

[54] AUTOMATIC CHEST X-RAY MACHINE

[76] Inventor: William J. Hogan, Medco Company, P.O. Box 236, Bally, Berks County, Pa. 19503

[21] Appl. No.: 849,939

[22] Filed: Nov. 9, 1977

[51] Int. Cl.² ............................................. G11B 1/00
[52] U.S. Cl. ................................... 250/468; 250/471
[58] Field of Search ................. 250/468, 469, 470, 477

[56] References Cited

U.S. PATENT DOCUMENTS

| | | | |
|---|---|---|---|
| 3,553,453 | 1/1971 | Hogan | 250/468 |
| 3,784,834 | 1/1974 | Berger | 250/468 |

FOREIGN PATENT DOCUMENTS

2616926  10/1977  Fed. Rep. of Germany ........... 250/468

Primary Examiner—Craig E. Church
Assistant Examiner—Thomas P. O'Hare
Attorney, Agent, or Firm—Paul & Paul

[57] ABSTRACT

An automatic chest X-ray machine has a tray of unexposed rectangular cut film in a film-supply magazine enclosed in a light-tight housing supported in an inclined position approximtely 30° from the vertical. A plunger pushes the lower portion of the tray forwardly toward a pair of vacuum suction cups which lift the top sheet of film and pull it forwardly and then upwardly forcing the upper edge of the lifted sheet of film against the upper edge of the tray and causing the sheet of film to bow outwardly. The vacuum cups then release their hold on the film and the resilience of the bowed sheet of film causes it to straighten out and drop down vertically into an open-clamp holder at the front of the machine at the exposure station. After the exposure has been made the clamping force is released, a trap door at the bottom of the holder is opened, and a pair of upper push-down fingers push the exposed sheet of film downwardly out of the holder and into one or more sets of transport rollers which transport the exposed sheet of film rearwardly and deposit it in a tray. Upon sensing arrival of a sheet of film, the tray pivots about its horizontal center axis and drops the sheet of exposed film into a chute leading to a film-developing machine.

12 Claims, 13 Drawing Figures

AUTOMATIC CHEST X-RAY MACHINE

BACKGROUND OF THE INVENTION

This invention relates to chest X-ray machines, and in particular to a chest X-ray machine having a film-supply magazine and automatic means for taking a sheet of cut film sheet from the supply magazine, moving it into position at the exposure station and, following the exposure, automatically transporting the sheet of exposed film toward a film-developing machine.

SUMMARY OF THE PRESENT INVENTION

A principal object of the present invention is to provide an improved chest X-ray machine of the automatic type.

Another purpose of the invention is to provide an automatic or semi-automatic chest X-ray machine which has the capability of exposing the rectangular sheet of film in either vertical or horizontal orientation, thereby to accomodate to persons having chests of different widths and heights.

Another object is to provide a chest X-ray machine having improved means for lifting the uppermost sheet of cut film from a supply tray and depositing it at the exposure station.

DETAILED DESCRIPTION OF THE PREFERRED EMBODIMENT

Figure 1:
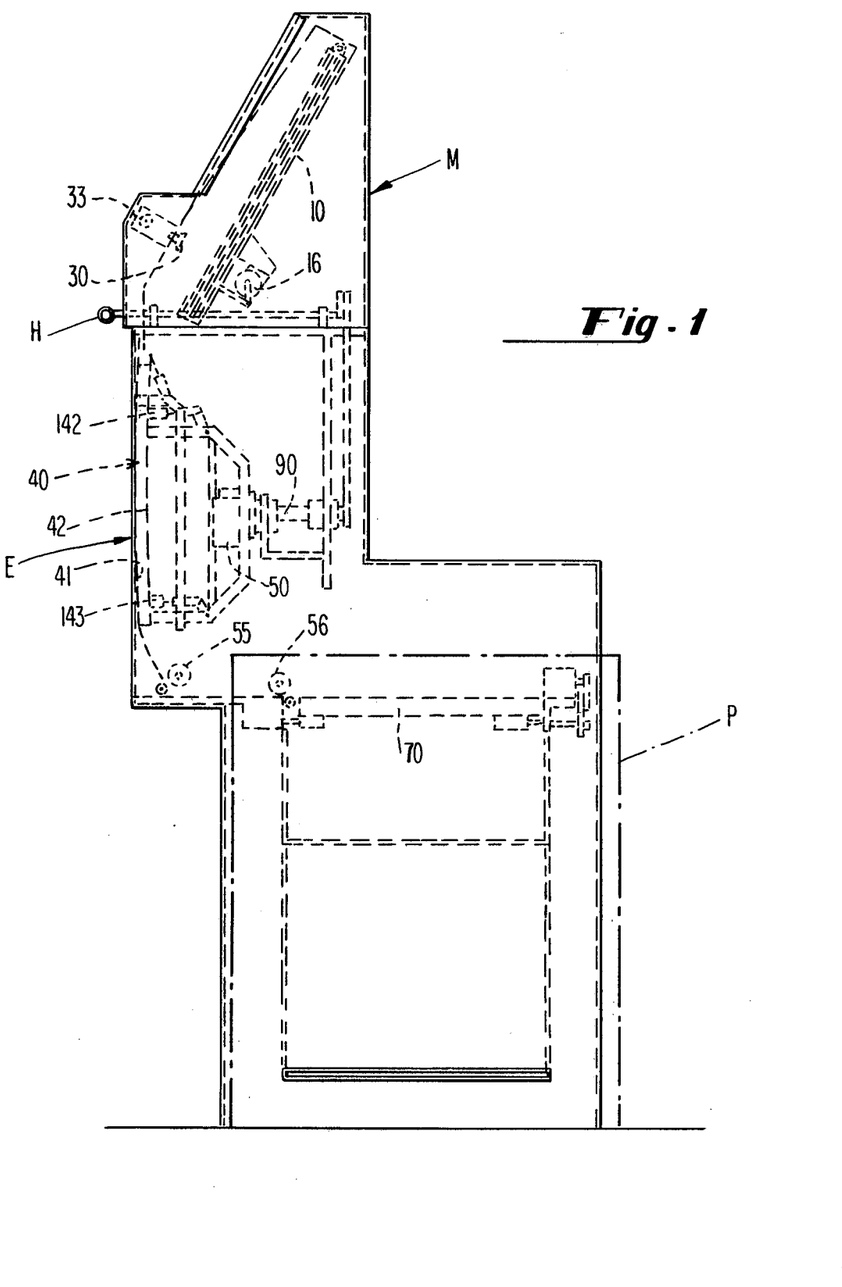
FIG. 1 is a side elevational schematic view of a chest X-ray machine of the present invention.

Referring now to FIG. 1, there is shown an overall view of the semi-automatic chest X-ray machine which embodies the improvements and features of the present invention. Mounted at the top of the machine is a film supply magazine section identified M. In Section M, vacuum cups lift the topmost sheet of cut film F' from the inclined tray 10 and deposit it into a guide chute leading to a film holder 40 at an exposure station located therebelow and identified E. The film holder 40 at the exposure station E is mounted on a stub shaft 90 for rotation through 90° so that the rectangular film may be presented for exposure in either the vertical or horizontal orientation, thereby to accomodate to chests widths of different sizes. Following exposure, the sheet of film is released from the film holder and transported to a tray 70 for discharge toward a film processor located therebeneath and identified P.

Figure 2:
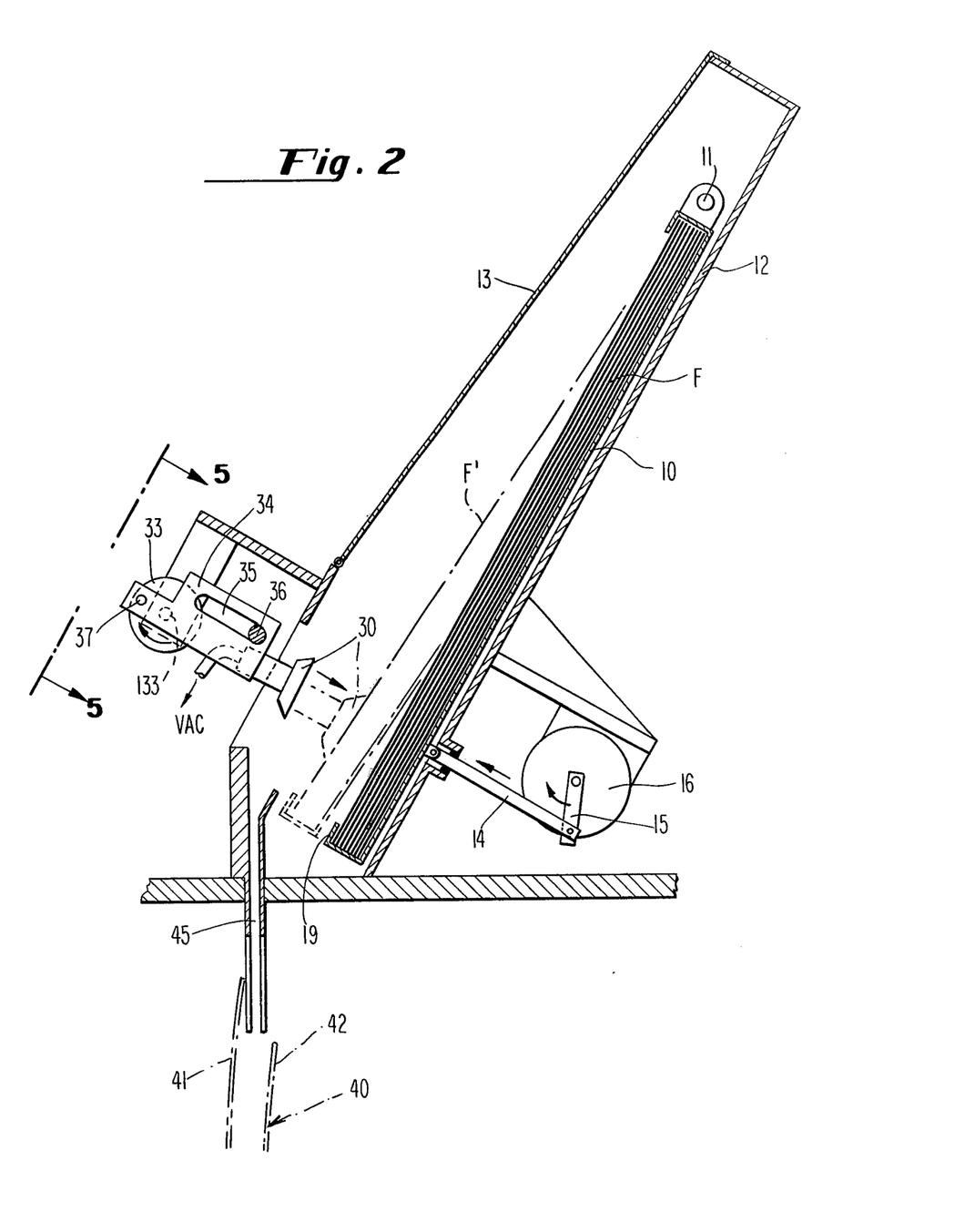
FIGS. 2-4 are side elevational views, in section, of the film supply magazine section.

FIG. 2 shows details of the supply magazine section M. A supply of cut sheets of unexposed film F are placed in a tray 10 pivotally supported within a light-tight magazine 12. The magazine 12 is shown as having a hinged front cover 13 for access. The magazine 12 and tray 10 are at an angle of about 30° from the vertical. Such an angle has been found to facilitate lifting of the topmost sheet of film F' by the vacuum cup means, later to be described. The tray 10 is supported for pivotal movement about a pivot axis 11 located at the upper end of the tray. The sheets of cut film are rectangular in shape, typically 14" wide by 17" high.

When the operator pushes a start button, a motor is energized to operate a vacuum pump not shown. The same motor may be used to drive a drive shaft 130 shown in FIG. 5. Shaft 130 drives a pair of vacuum cups 30 along a generally rectangular path the shape of which is controlled by an eccentric mechanism to be described.

Also actuated by the operator start button is a rotary solenoid 16 seen in FIG. 2. This solenoid drives an eccentric arm 15 in a clockwise direction to move a pusher arm 14 forward in the direction of the arrow through a light-tight opening in the rear surface of the magazine 12. This forward motion of pusher arm 14 moves the lower end of tray 10 pivotally forward toward a pair of suction cups 30. Only one suction cup 30 is visible in FIG. 2 but both cups 30 are seen in FIG. 5, one on each side of the machine.

Figure 5:
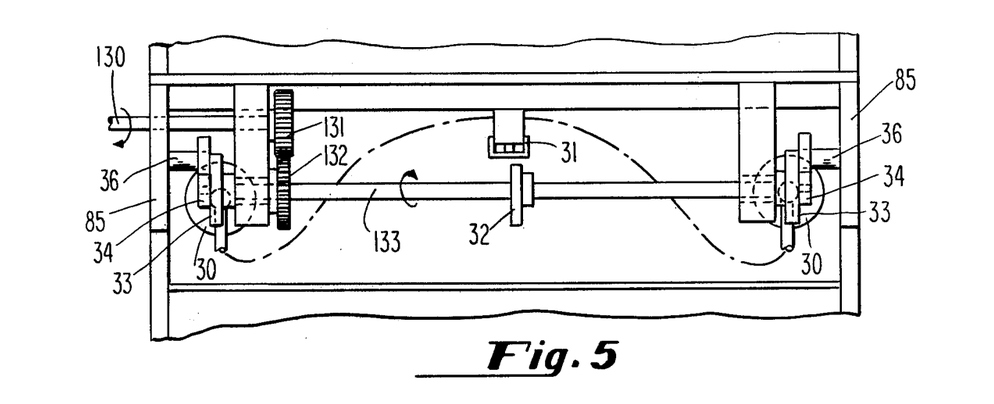
FIG. 5 is a front elevational view, in section, showing the drive mechanism for the vacuum cups.

At the same time that tray 10 is pushed pivotally forward by pusher arm 14, the vacuum pump previously referred to is actuated and the vacuum cup drive shaft 130, seen in FIG. 5, starts to rotate.

Referring now to FIG. 5, when shaft 130 is rotated a spur gear 131 mounted thereon drives a spur gear 132 which is fixed on a cross shaft 133. Accordingly, shaft 133 is driven rotationally. Mounted on cross shaft 133 for rotation therewith are a pair of eccentrics 33, one at each end of shaft 133. One of these eccentrics 33 is seen in FIG. 2. Both eccentrics 33 are visible in FIG. 5.

Referring now to FIG. 2, as well as to FIG. 5, a slotted guide plate 34 is pinned by pin 37 to each eccentric 33. Projecting from each side frame member 85 is a fixed guide stud 36 which is received within a slot 35 in guide plate 34. Mounted at the rearward end of each guide plate 34 is a vacuum cup 30. It will be seen from FIG. 2 that as the eccentric 33 is driven rotationally, the vacuum cup 30 moves in a path controlled by guide plate 34, guide stud 36, and slot 35.

Figure 3:
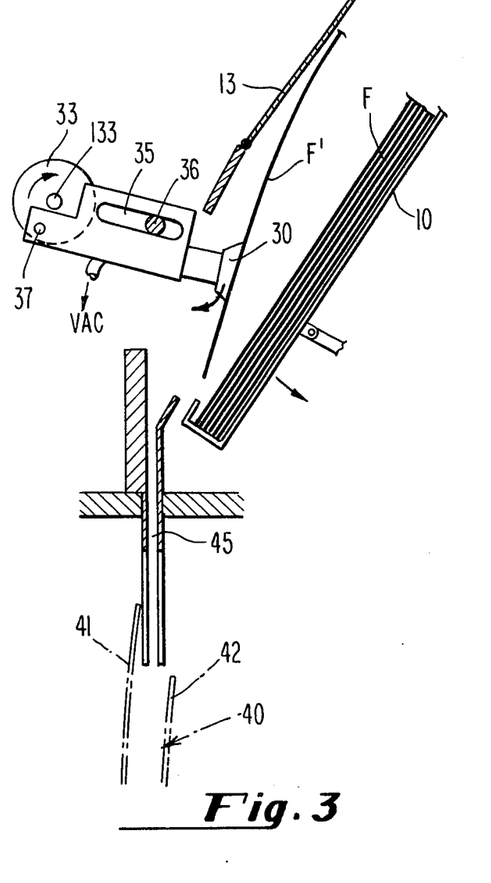
Figure 4:
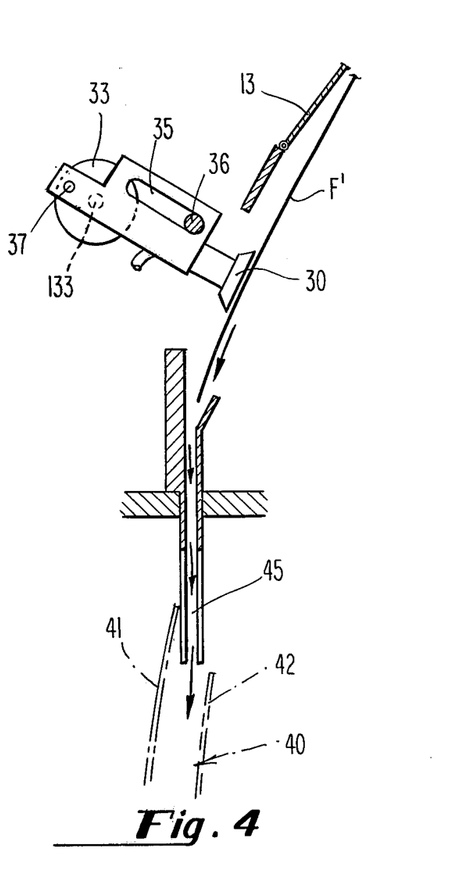

FIGS. 2, 3 and 4 illustrate the path traced by the vacuum cup 30 when the cross shaft 133 is driven rotationally.

In FIG. 2, eccentric pin 37 is shown in its most forward position. The term "forward" as used herein is related to the forward portion or front of the machine. As eccentric 33 is moved rotationally clockwise from the position shown in FIG. 2, pin 37 moves upwardly and rearwardly, and vacuum cup 30 moves downwardly and rearwardly toward the position shown in phantom in FIG. 2. As eccentric 33 continues its clockwise rotation, cup 30 is moved further rearward and then starts upward as pin 37 starts downward. During this movement, cup 30 engages and presses against the topmost sheet of film F' as illustrated in phantom in FIG. 2. As eccentric 33 continues its rotational movement, eccentric pin 37 moves further downward and forward, and vacuum cup 30 moves further upward and forward, carrying the sheet of film F with it. This is illustrated in FIG. 3. It will be seen from FIG. 3, that the lower edge of the lifted film F' has been carried above and forward of the lower lip 19 of tray 10.

In FIG. 4, eccentric 33 has completed one revolution and has returned to its original position in which cup 30 is as far forward as it goes. As cup 30 approaches this most forward position, a cam 32, seen in FIG. 5, mounted on shaft 133 actuates a valve 31 to open the vacuum line. This releases the lifted film F' from the vacuum cup 30 and, as illustrated in FIG. 4, the energy stored in the bowed sheet of film F' causes the sheet F' to spring downwardly toward the mouth of a guide chute 45 which leads toward the pocket of the film holder 40 formed between a face plate 41 and a clamp or pressure plate 42.

Figure 6:
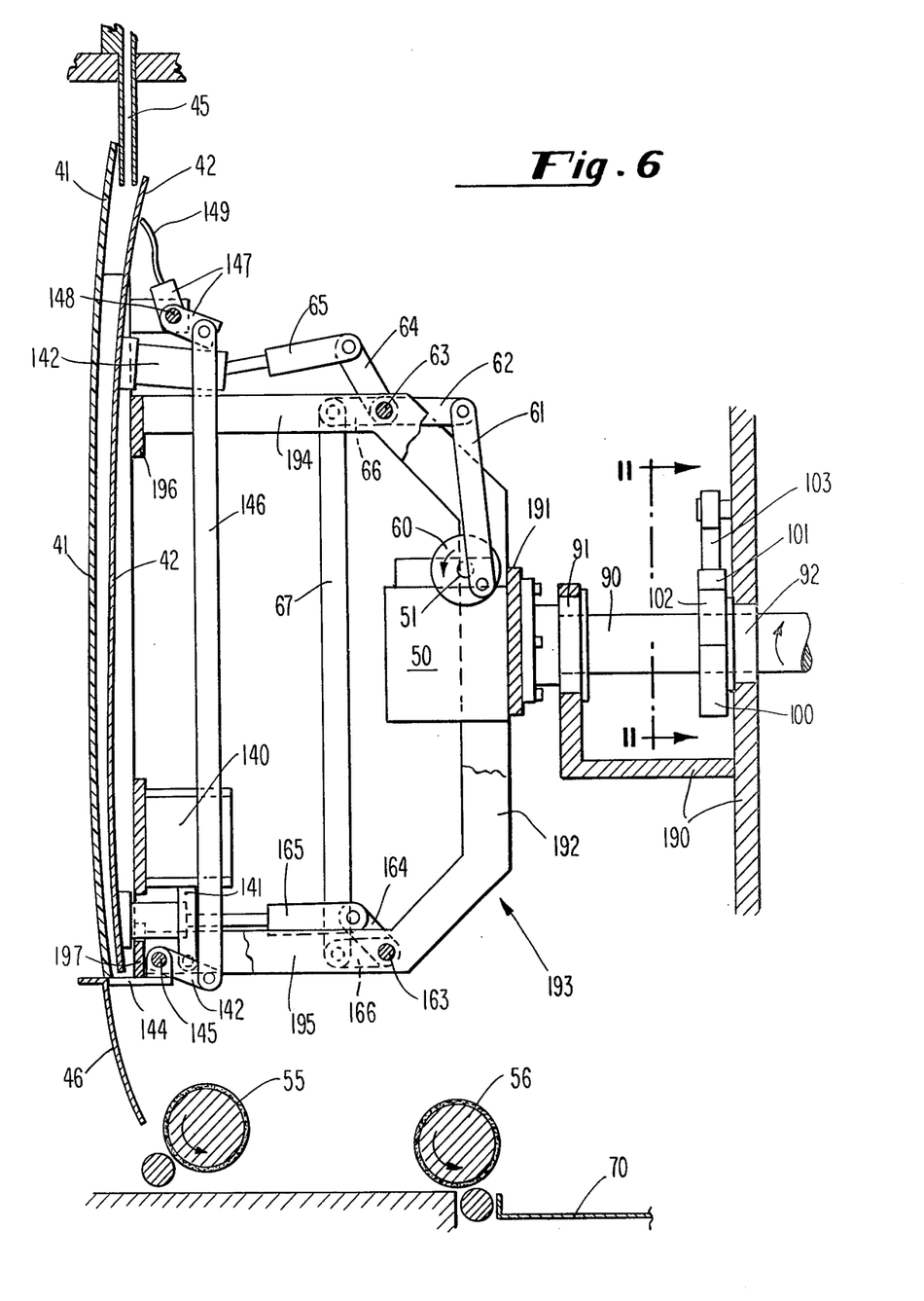
FIG. 6 is a side elevation view, in section, of the exposure station showing the film holder mounted for 90° rotation.
Figure 10:
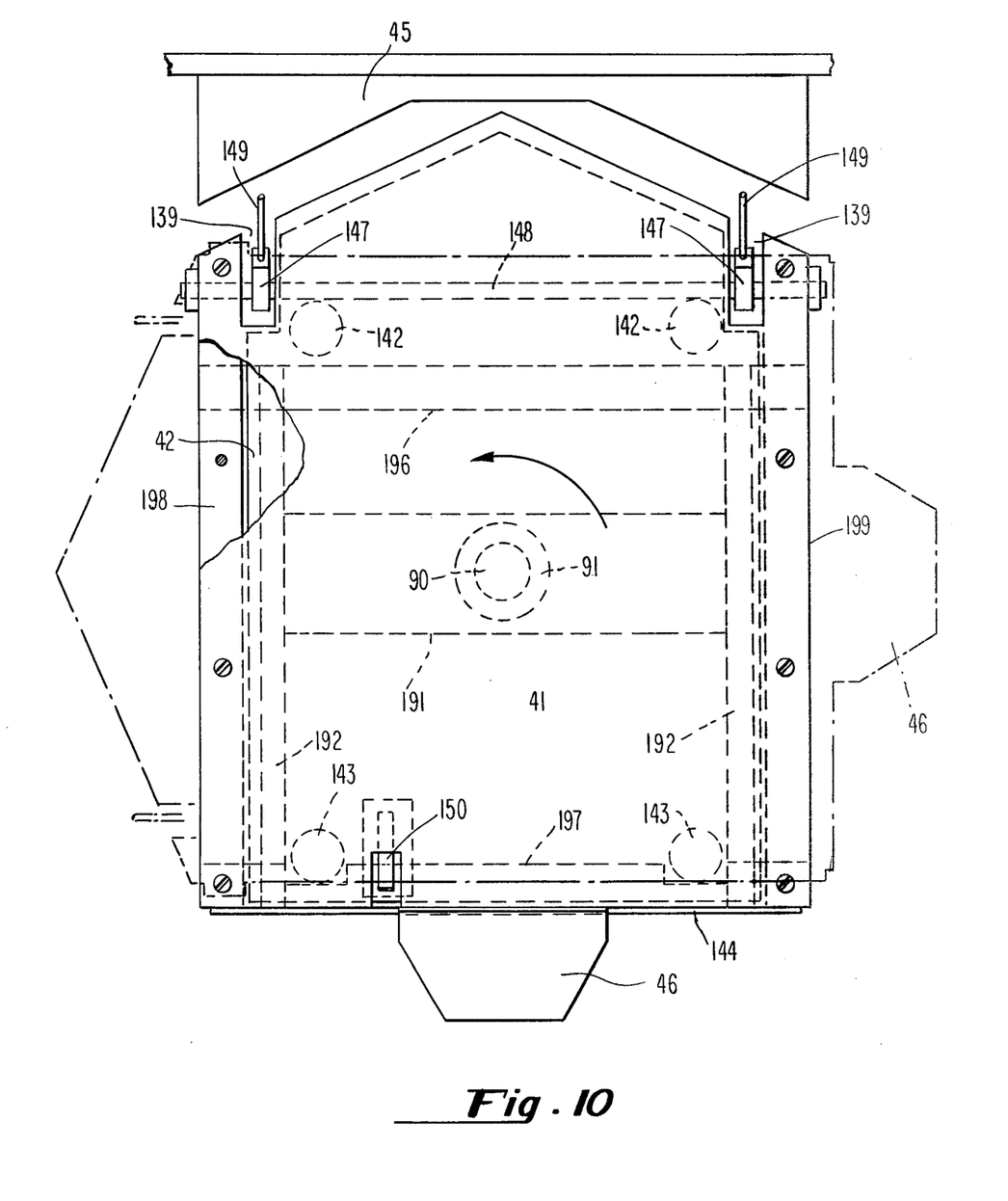
FIG. 10 is a front elevation view of the exposure station.

Referring now to FIG. 6, a stub shaft 90 is mounted in spaced-apart bearings 91,92 in frame members 190. Shaft 90 is centrally located and in alignment with the center axis of the film holder 40. A cross plate 191, seen in phantom in FIG. 10, is secured to the forward end of shaft 90. Secured to each end of cross plate 191 is a C-shaped frame member 193 having a vertical segment 192, a horizontal upper segment 194 and a horizontal lower segment 195. An upper cross bar 196 is secured to the forward ends of the horizontal upper segments 194 of the spaced-apart C-frame members 193, and a lower cross bar 197 is secured to the forward ends of the horizontal lower segments 195. These cross bars are seen, in phantom, in FIG. 10.

Secured to each end of the upper and lower cross bars 196,197 is a vertical side frame member 198 and 199, one on each side of the frame. These members 198,199 support the face plate 41 of the exposure station. Face plate 41 must, of course, be X-ray transmissive and may be made of plastic, preferably Bakelite. Secured to the upper portion of the clamp or pressure plate 42 and extending rearwardly therefrom at each side of the plate is a short hollow stud 142, and a similar stud 143 at the lower portion. These hollow studs 142,143 receive the forward portions of spring-loaded upper and lower plungers 65 and 165, respectively. These plungers are pivotally connected to upper and lower link arms 64 and 164, respectively, which are mounted on and secured to upper and lower pivot shafts 63 and 163, respectively, for pivotal movement therewith. The pivot shafts 63 and 163 are supported in frame members 194 and 195. The upper pivot shaft 63 is driven rotationally through a fraction of a revolution by a pair of link arm 62,61, the latter of which is driven by an eccentric 60 mounted on a shaft 51.

Projecting laterally from upper pivot shaft 63 is a stub arm 66 and extending downwardly from the end of stub shaft 66 is a vertical rod 67. The lower end of rod 67 is connected to a corresponding stub arm 166 which projects laterally from the lower pivot shaft 163. Thus, when eccentric 60, acting through link arms 61 and 62, causes the upper pivot shaft 63 to turn angularly, the lower pivot shaft 163 also turns angularly in a corresponding manner, and lower link arms 164 and 165 are caused to move in a manner generally similar to the movement of the corresponding upper link arms 64 and 65.

Figure 7:
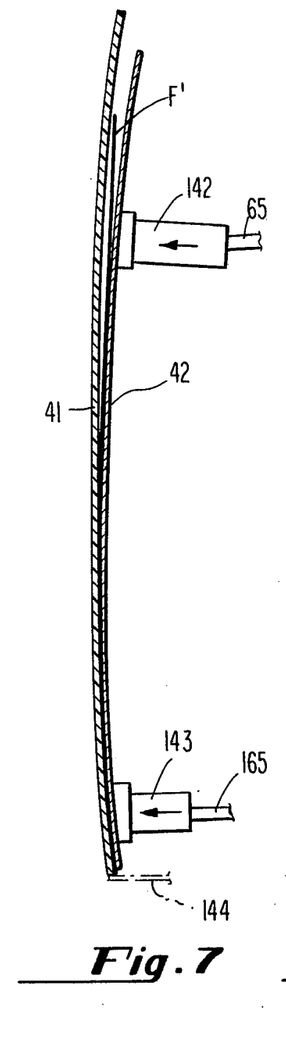
FIGS. 7-8 are sequential views showing the sheet of unexposed film at the exposure station being clamped in the film holder.
Figure 8:
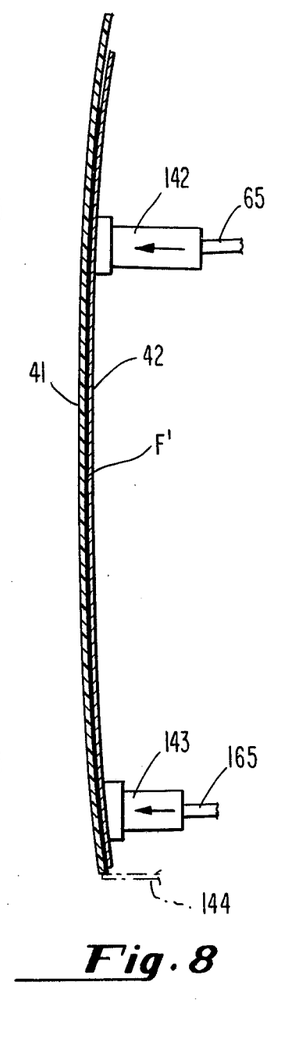

The function of the mechanism now being described is to move the clamp or pressure plate 42 forwardly to press the film F' against the face plate 41. The mechanism is designated to move the lower portion of the clamp plate 42 forwardly before the upper portion is moved forwardly. This is illustrated in FIGS. 7 and 8. The mechanism illustrated in FIG. 6 for accomplishing this desired result includes the arms 64 and 164 and the relative angular positioning of these arms on their respective pivot shafts 63 and 163. Also involved are the relative lengths of the plungers 65 and 165.

The linkage mechanism just described, whose function is to clamp the film F' in the holder 40 between the face plates 41 and the pressure plate 42, is actuated by a motor 50, seen in FIG. 6. This motor 50 is triggered on by a sensing switch 150, seen in FIG. 10. This switch 150 detects the arrival of a film F' in the holder 40 and in response thereto the motor 50 is actuated. Once actuated, the running of the motor 50 is controlled by cams not shown mounted on the cam shaft 51. These cams allow motor 50 to turn only through 180° after which the cam-operated switches shut-off the motor.

It has been described how the topmost sheet of film F' is lifted from the tray 10 and deposited in the holder 40. By means later to be described, holder 40 may be rotated on stub shaft 90 through 90° so that the unexposed film F' in the holder 40 at the exposure station may be exposed in either a vertical or horizontal orientation. In FIG. 10, the holder 40 is shown in solid line in vertical orientation and in phantom in horizontal orientation. If holder 40 is turned 90° to the horizontal orientation for the exposure, then, after the exposure is made, the holder 40 is returned to vertical orientation for discharge of the exposed film to the transport rollers which carry the film toward the post-exposure equipment.

Figure 9:
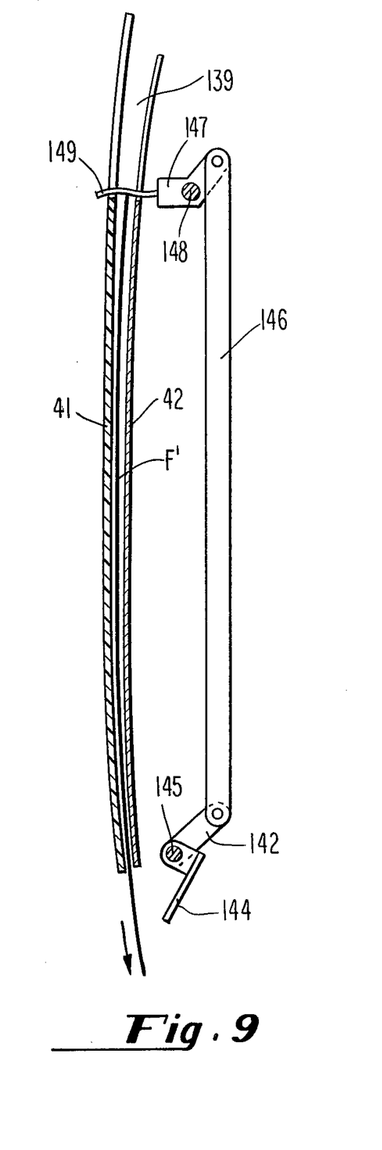
FIG. 9 is a view showing the exposed film being discharged from the holder.

Assume now that film F' in holder 40 has been exposed, and is now in vertical orientation in the holder. The operator now presses a release button to release the film and remove it from the holder. In response to operation of the release button, the motor 50 is first actuated to turn through another 180°. This has the effect of withdrawing the plungers 65 and 165 and pulling the hollow posts 142 ad 143 rearwardly, thereby to move pressure plate 42 rearwardly and release the film in the holder. Next a solenoid 140 is actuated causing plunger 141 to pull up link 142 and causing pivot shaft 145 to move angularly in a counterclockwise direction. This is best seen in FIG. 9. This opens trap door 144 at the bottom of film holder 40.

When pivot shaft 145 is rotated, a vertical rod 146 is pushed upwardly, causing pivot arm 147 to pivot in a counterclockwise direction on an upper pivot shaft 148. When link arm 147 so pivots, a pair of push-down fingers 149, one at each side of holder 40 as seen in FIG. 10, carried at the forward end of pivot arms 147, push down on the top of the exposed film F' in the now-opened clamp or holder 40. This pushes the film F' down as illustrated in FIG. 9. Slots 139 are provided in the frame members for receiving the push-down fingers 149. These slots 139 are best seen in FIG. 10.

Figure 12:
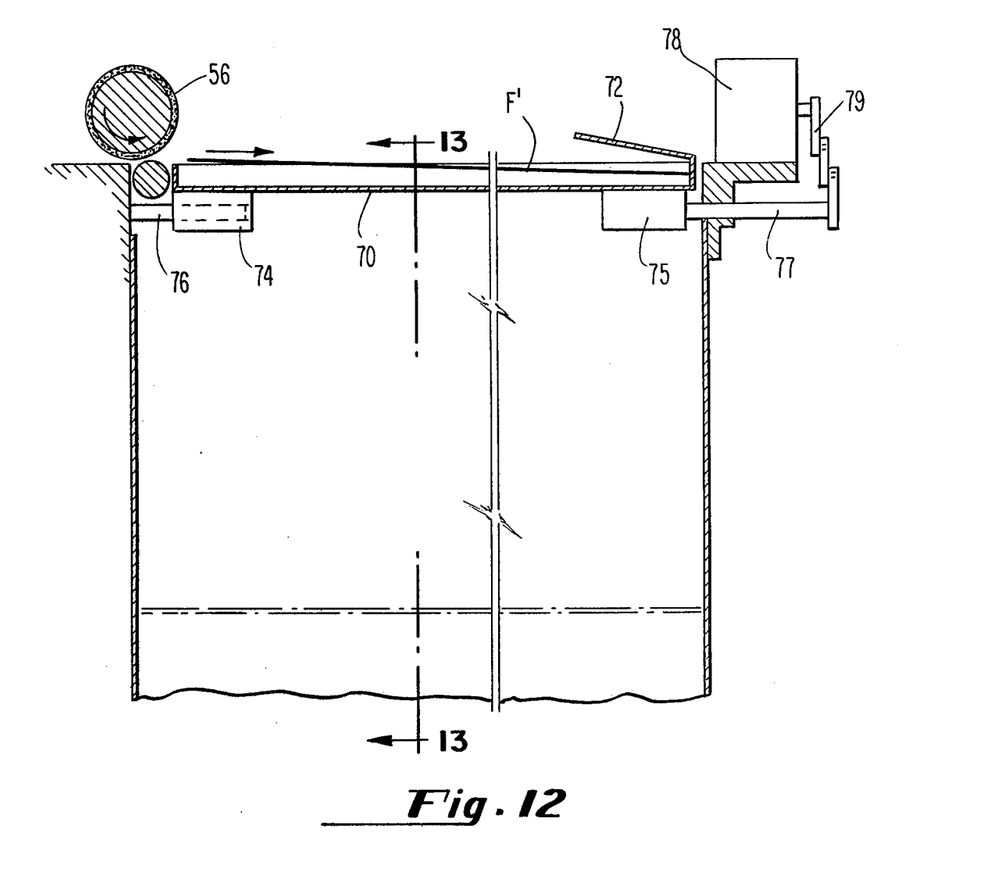
FIG. 12 is a side elevational view of the post-exposure film-receiving tray and film discharge means.
Figure 13:
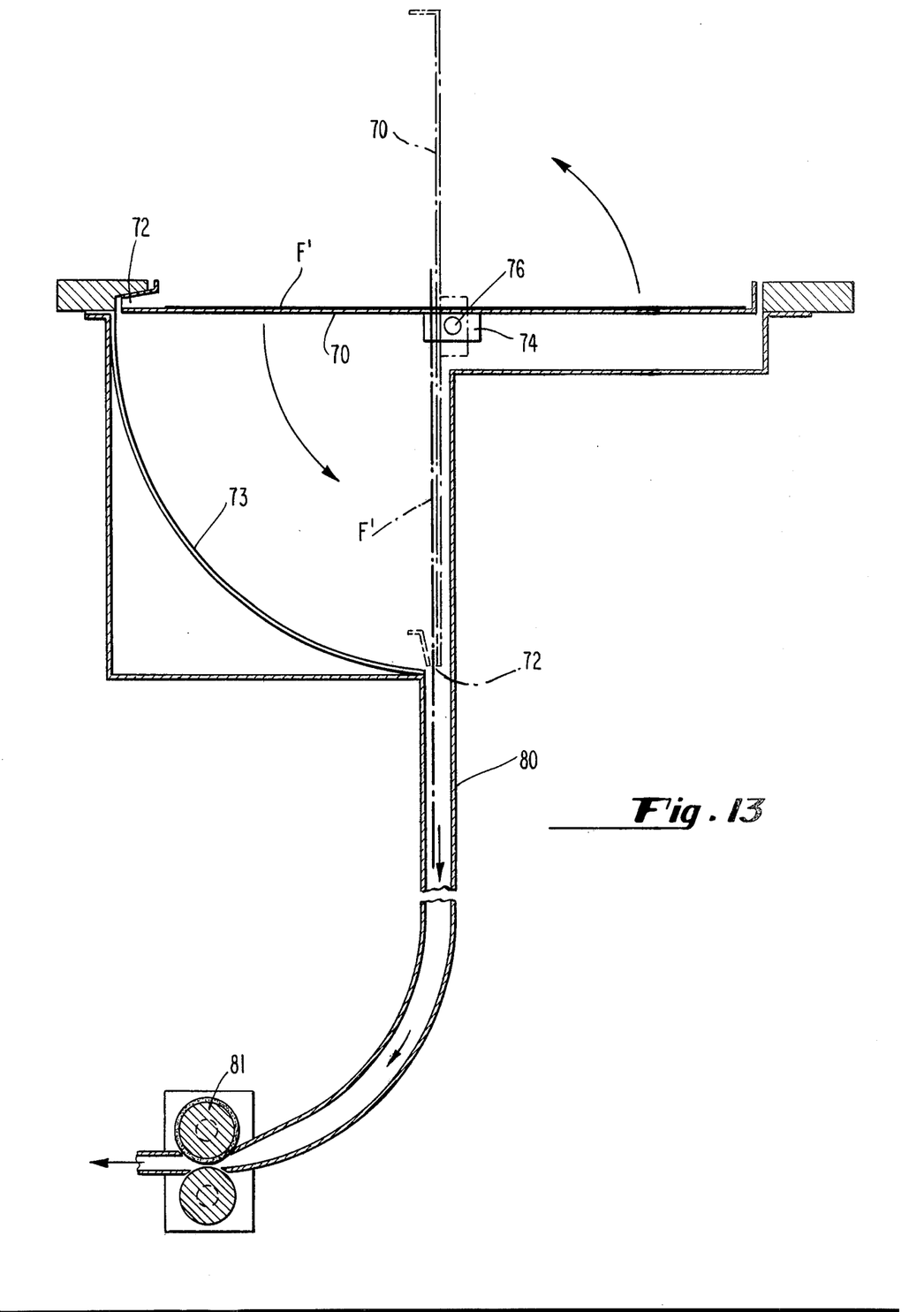
FIG. 13 is a rear elevational view of the post-exposure film-receiving tray and film discharge means.

Referring again briefly to FIG. 6, when the exposed film F' is pushed down, it is guided by plate 46 and enters the nips of advance rollers 55 and 56 and is transported into and received by a tray 70, shown in FIGS. 12 and 13. Referring now to FIGS. 12 and 13, the rapidly moving sheet of exposed film F' hits a deflector plate 72 and the film drops down into the tray 70. Tray 70 is supported on blocks 74 and 75 which in turn are supported on pivot shafts 76 and 77. These pivot shafts are supported in the frame and are located on the center axis of the tray 70, as seen in FIG. 13. Arrival of a sheet of exposed film F' in the tray 70 is detected by suitable sensing means not shown and a rotary solenoid 78 (FIG. 12) is actuated. Actuation of solenoid 78 drives linkage 79 which drives pivot shaft 77 angularly through 90°, thereby pivoting tray 70 about its center axis.

As seen in FIG. 13, when tray 70 pivots in the counterclockwise direction, the sheet of film F' in the tray is prevented from sliding out through the exit throat 72 by a pair of curved retaining bands 73. When tray 70 reaches a vertical position, indicated in phantom in FIG. 13, the sheet of exposed film F' drops down through the exit throat 72 of the tray into an exit chute 80 which leads to a film processor. Movement of the exposed sheet of film toward the processor may be aided by a pair of advance rolls 81.

As mentioned previously herein, an important feature of the apparatus of the present invention is the provision of means for mounting the film holder 40 at the exposure station in such manner that the film holder 40 may be rotated 90° to change the orientation of the film from vertical to horizontal to accomodate the persons having chests of greater width. This is accomplished, in accordance with the present application, by mounting the film holder 40 on a pair of spaced-apart C-shaped frame members 193, mounting the C-shaped frame members on a cross plate 191, and mounting the cross plate 191 at the forward end of a center stub shaft 90 supported in bearings 91 and 92 in frame 190.

In accordance with a feature of the present application, means are provided for latching the film holder 40 in either the vertical or horizontal positions. This is achieved by means of a notched cam 100 seen in FIGS. 6 and 11, FIG. 11 being a view taken along the line 11—11 of FIG. 6. Cam 100 is provided with a pair of notches 101 and 102 for receiving the latch arms 103 and 104 respectively. The latch arms 103 and 104 are pivotally mounted in frame member 190. The ends of latch arms 103 and 104 remote from the pivot ends are spring biased toward the cam 100 and are withdrawn by actuation of solenoids 110 and 112, respectively. The plungers of these solenoids are connected to the ends of the latch arms 103 and 104 through linkages 111 and 113, respectively.

Figure 11:
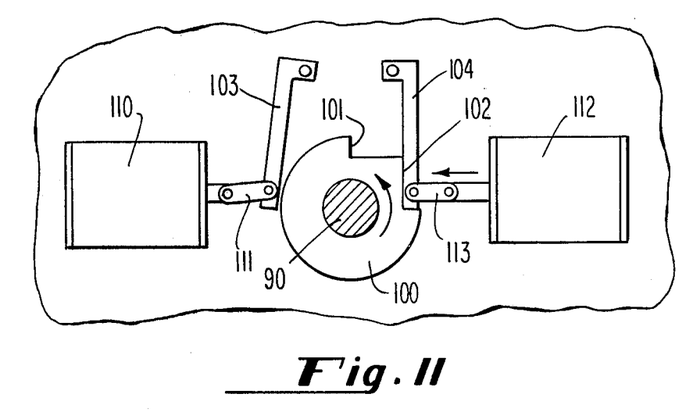
FIG. 11 is a view of the shaft latch as seen looking along the line 11—11 of FIG. 6.

In operation, when the operator desires to change the orientation of the film in the holder 40 at the exposure station, he presses a switch button to actuate the appropriate solenoid 110 or 112 to withdraw its latch arm 103 or 104 from the cam notch. He then rotates the shaft 90, counterclockwise as seen in FIG. 11, by means of a handle H seen in FIG. 1. Handle H is connected to shaft 90 by means of suitable link arms indicated in phantom in FIG. 1. When the shaft 90 has been rotated 90°, the spring-loaded latch arm 103 will enter notch 101 and prevent further rotation of the shaft 90, thereby locking holder 40 in the horizontal position shown in phantom in FIG. 10.

What is claimed is:
1. A chest X-ray machine having supporting frame members and also comprising:
   a. a film-exposure station, said station including a vertically-disposed film-receiving holder having a pocket closed at its lower edge and opened at its top, said holder having a vertically-disposed front X-ray-transmissive plate and a vertically-disposed rear movable pressure plate;
   b. a film guide chute above the open top of said holder;
   c. a magazine located above the film-exposure station having a tray for containing a supply of cut-sheet unexposed film, said magazine being inclined relative to the vertical;
   d. means, including vacuum cup means, for lifting a topmost sheet of film from the film supply by an upward sliding motion and for carrying it to a position above said guide chute such that upon release of suction the released film sheet will drop through said guide chute into the pocket of said holder;
   e. means for moving said rearward pressure plate forwardly against the film sheet in said holder pocket, said moving means moving the lower part of said pressure plate forwardly against the lower part of said film sheet before the upper part of said pressure plate is moved forwardly against the upper part of said film sheet, thereby to force air upwardly out of said holder pocket;
   f. a horizontally-disposed stub pivot shaft journalled in at least one of the frame members and located on the center axis of, and rearward of, said exposure station;
   g. support means mounting said exposure station vertically on said stub shaft for angular movement therewith;
   h. means for opening the closed bottom of said film holder pocket; and
   i. film transport means for transporting a film sheet which drops through the open bottom of said holder pocket at said exposure station toward film processor means.

2. Apparatus according to claim 1 wherein latch means are provided for latching said stub pivot shaft in either one of two angular positions spaced 90° apart.

3. Apparatus according to claim 2 wherein said latch means includes:
   a. a cam mounted on and fixed to said pivot shaft;
   b. first and second notches in the cam surface;
   c. first and second finger stops supported on said frame members and adapted to be received within said first and second cam notches, respectively; and
   d. means for withdrawing said finger stops.

4. Apparatus according to claim 3 wherein first and second solenoids are provided having plungers connected to said first and second finger stops for withdrawing said stops from said cam notches to release said pivot shaft for angular movement.

5. Apparatus according to claim 1 wherein said vacuum cup means for lifting a topmost sheet from the film supply includes:
   a. first and second suction cups mounted above and forward of said film supply;
   b. first and second eccentric cams;
   c. first and second cam bars connecting said eccentric cams to said vacuum cups, each cam bar having a cam slot therein;
   d. first and second studs fixed to said frame members and projecting into said slots of said first and second cam bars for controlling the cyclic motion of said cam bars and vacuum cups in response to rotation of said eccentric cams; and
   e. drive means, including a cam drive shaft, for driving said eccentric cams rotationally.

6. Apparatus according to claim 5 wherein said eccentric cams and slotted bars are so designed that the motion cycle of said vacuum cups is generally rearward, upward, forward, and downward, said rearward movement being effective to engage said topmost sheet of film, said upward movement being effective to push the upper edge of said topmost film sheet against the upper edge of the film-supply tray causing said film sheet to bend or bow outwardly, said forward movement causing the lower edge of said film sheet to move outwardly to clear the lower rim of the film tray.

7. Apparatus according to claim 6 wherein cam means are provided on said cam drive shaft for opening the vacuum circuit to the vacuum cups at a selected point in the motion cycle after rearward and upward motions.

8. Apparatus according to claim 1 wherein said film exposure station includes sensing means for sensing the arrival of a sheet of film in the film-receiving holder, and means responsive to a said sensing means for moving said pressure plate forwardly toward said front plate for clamping said film therebetween.

9. Apparatus according to claim 8 wherein said means for moving said pressure plate forward includes a drive motor, an eccentric driven by said motor, and upper and lower linkages connecting said eccentric to the upper and lower portions of said pressure plate.

10. Apparatus according to claim 9 wherein said upper and lower linkages are so arranged that the lower portion of said pressure plate presses said film against said front plate before the upper portion of said film is pressed against said front plate.

11. Apparatus according to claim 5 wherein means are provided at said magazine for moving said film supply toward said vacuum cups.

12. Apparatus according to claim 4, wherein said film supply is disposed at an inclination of the order of 30° relative to the vertical.

* * * * *